March 1, 1966  A. E. LE VAN ETAL  3,238,487
FLUID PRESSURE RESPONSIVE TRANSDUCER
Filed March 30, 1964  3 Sheets-Sheet 1

INVENTORS
AMBROSE E. LEVAN
JAMES D. FULMER
BY
Robertson Smythe & Bryan
ATTORNEYS

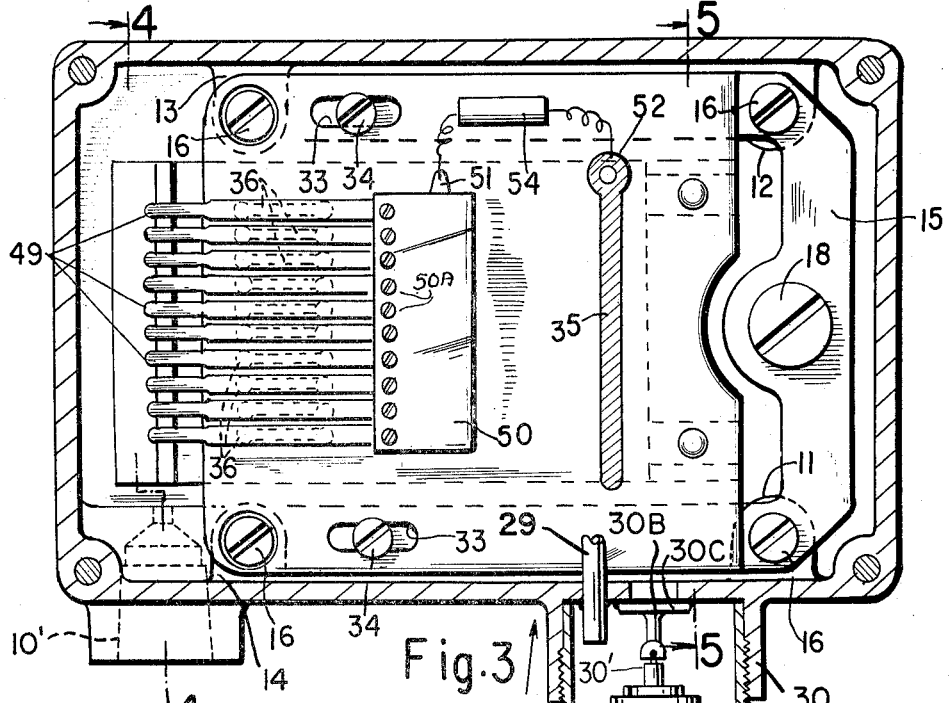
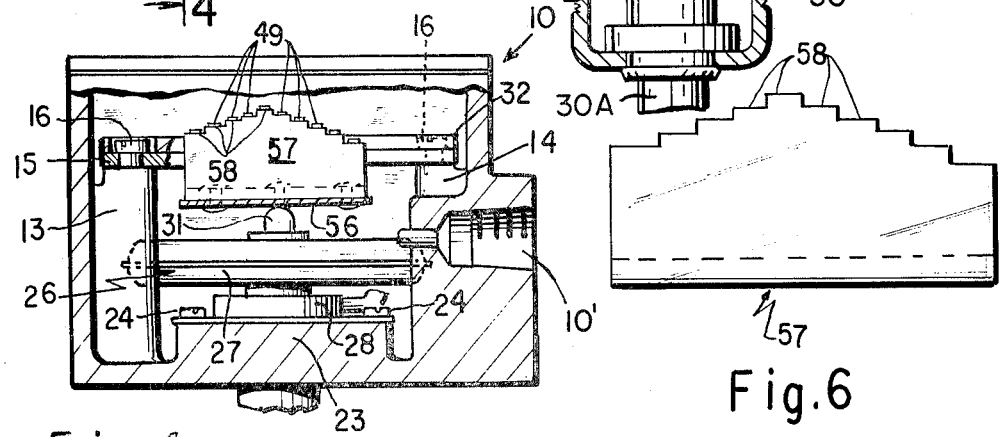
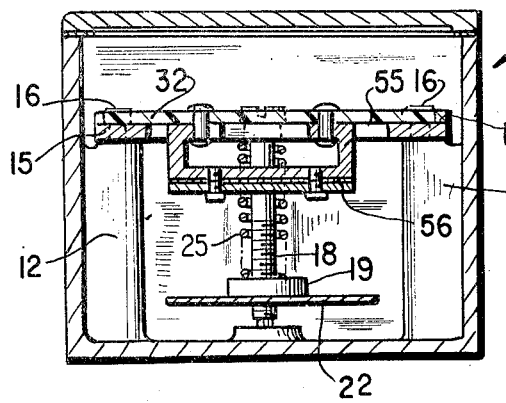
INVENTORS
AMBROSE E. LeVAN
JAMES D. FULMER
BY
Robertson Smythe & Bryan
ATTORNEYS March 1, 1966 A. E. LE VAN ETAL 3,238,487
FLUID PRESSURE RESPONSIVE TRANSDUCER
Filed March 30, 1964 3 Sheets-Sheet 3

INVENTORS
AMBROSE E. LE VAN
JAMES D. FULMER
BY
Robertson Smythe & Bryan
ATTORNEYS

United States Patent Office 3,238,487
Patented Mar. 1, 1966

3,238,487
FLUID PRESSURE RESPONSIVE TRANSDUCER
Ambrose E. Le Van, Short Hills, N.J., and James D. Fulmer, Quakertown, Pa., assignors to Ametek, Inc., New York, N.Y., a corporation of Delaware
Filed Mar. 30, 1964, Ser. No. 355,831
20 Claims. (Cl. 338—41)

The present invention relates to transducers, and particularly to a new and improved fluid pressure to electrical signal transducer.

Small, inexpensive but rugged transducers are constantly in demand in industry. Included among the uses to which such a device may be put is the provision of such transducers at intervals along subscriber lines leading from a central station of a telephone network. Such subscriber lines are often encased within cables filled with gaseous dielectric under pressure for insulation purposes. Should a leak develop in such lines, it normally becomes a substantial task to find the approximate location of the leakage in order to effect the repair of the cable.

The principal object of the present invention is to provide a pressure-electric transducer that will be of rugged construction, of small size and inexpensive to manufacture.

Another object of the invention is to provide such a transducer that will convert pressure variations into electrical signals capable of being detected at great distances from the source of pressure variation.

Still another object of the invention is to provide such a transducer that will successively add fixed resistances to, or subtract them from, an electrical circuit in response to the increase and decrease in pressure supplied to the transducer.

Still another object of the invention is to provide such a transducer in which a plurality of finger contacts may be operated in accordance with a predetermined sequence.

Still another object of the invention is to provide such a transducer in which the finger switch action can be readily adjusted.

In one aspect of the invention, a support may include spaced standards on which is fixedly mounted a frame member within a hermetically sealed housing, the interior of which latter may be connected to a source of fluid pressure, the variations of which are desired to be known. A resilient, flexible sheet may be fixed at one end to boss means on said support, and its other end may be adjustably connected to the frame member such that the flexible sheet and frame are in parallel spaced relation.

In another aspect of the invention, a pressure-responsive element such as a bellows or the like may be mounted on said flexible sheet, and its interior may be open to atmosphere through a line extending through an electrical fitting having a seal through which electrical power lines also pass to the interior of the housing.

In still another aspect of the invention, a printed circuit board may be mounted for adjustment on the frame and it may support a plurality of resistances of predetermined value that are all connected in parallel or series with said power lines, and each has its own terminal contact.

In a still further aspect of the invention, the board may support a flexible strip element, parallel to and located between the frame and the flexible sheet supporting the pressure-sensitive member, and adapted to be moved by movements incident to variations in pressure applied to the pressure-sensitive member.

In still another aspect of the invention, a stepped cam member may be fixed to the free end of the flexible strip supported by the printed circuit board, and it may be arranged to actuate finger contact means, one for each of the resistance terminal contacts, in a predetermined sequential order.

The parallel or series connected resistors may be connected across a pair of subscribers' lines, and a relatively large resistance may be provided between the parallel connected resistors and finger contacts so that the adding of resistances to, and subtracting of resistances from the circuit will not affect the transmission of voice over the subscriber's line.

The above, other objects and novel features of the invention will become apparent from the following description and accompanying drawings which are merely exemplary.

In the drawings:

FIG. 3 is a sectional plan view taken substantially along line 3—3 of FIG. 1;

FIG. 4 is a sectional elevational view taken substantially along line 4—4 of FIG. 3;

FIG. 5 is a sectional elevational view taken substantially along line 5—5 of FIG. 3;

FIG. 6 is an enlarged view of the stepped cam member; and

Figure 1:
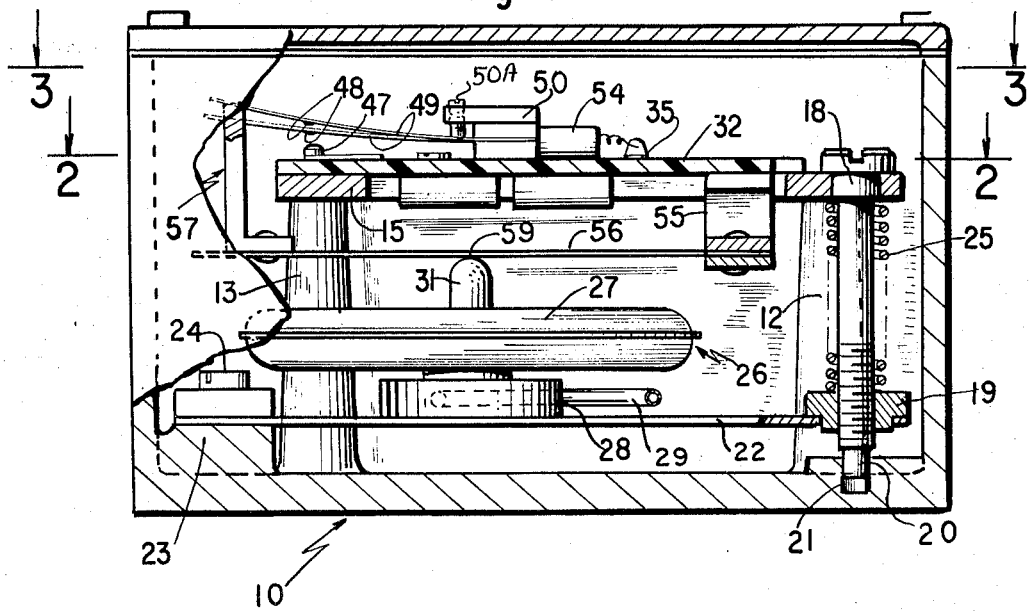
FIG. 1 is a sectional elevational view of a transducer to which the principles of the invention have been applied, and as taken substantially along line 1—1 of FIG. 3.

Referring to the drawings, the principles of the invention are shown as applied to a pressure-electrical transducer including a base or casing 10 that is hermetically sealed and includes a threaded passage 10' (FIG. 4) adapted to be connected to a source of fluid pressure, the variations of which are desired to be known. There may be four standards 11, 12, 13 and 14 within housing 10 adapted rigidly to support a metallic frame member 15 by screws 16. The frame 15 may include an adjusting screw 18 that is threaded through a nut member 19, and the lower end 20 of screw 18 is reduced in diameter and guided in a bore 21 within the bottom of casing or base 10. A relatively thin, flexible sheet member 22 has one end fixed to nut 19 and its opposite end rigidly mounted on a boss 23 within casing 10 by screw means 24. A spring 25 may surround screw 18 and be located between nut 19 and the underside of frame 15 for vibration stability.

A pressure-responsive device 26 may be mounted on flexible member 22, and the responsive element 27 may be of the capsule type. A hollow base 28 may be rigidly fixed to flexible member 22 and it may be connected to tube means 29, such as Tygon tubing, leading from the interior of base 28 to an electrical inlet fixture 30 (FIG. 3) including conductors 30' adapted to be connected across a pair of subscribers' line in the vicinity where fluctuations in pressure within the cable containing the subscribers' lines and a pressurized insulating gas might occur, such fluctuations varying the amount of resistance inserted into, or withdrawn from the electrical circuit of the subscriber. The lead lines 30A are connected to electrical feed elements 30B that feed through a plate 30C sealing an aperture through which power connections lead to a circuit board to be described later. The interior of base 28 is in communication with the interior of the responsive element 27, and the upper surface of the latter may include a proturberance or boss 31 on its axis of greatest motion incident to pressure variations within housing 10, all for a purpose to be described later.

Figure 2:
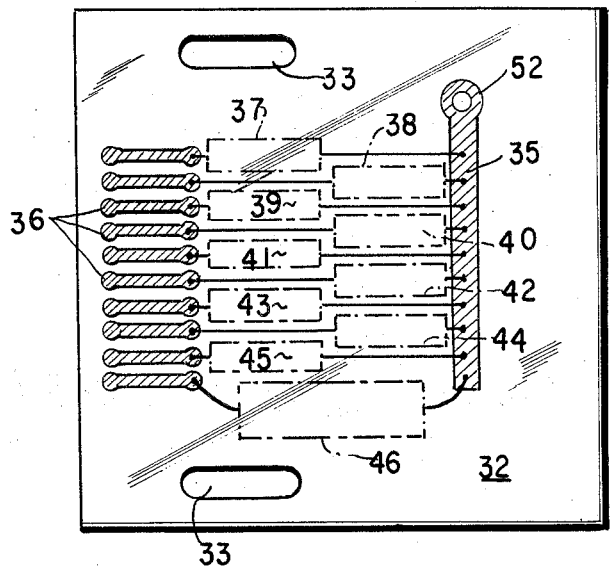
FIG. 2 is a plan view of a printed circuit board forming one component of the present invention, taken substantially along line 2—2 of FIG. 1.

The frame 15 is adapted to support an insulated printed circuit board 32 on its top surface, and it may include elongated holes 33 for receiving screws 34 that are threaded into frame 15 for adjustably supporting board 32 on frame 15. Referring to FIG. 2, the board 32 may include a common printed conductor 35 and a plurality of closely spaced, parallel arranged printed conductors 36 at right angles to, and spaced a substantial distance from conductor 35. A plurality of impedance means, shown in the present embodiment as fixed resistances 37 to 46, inclusive, may be located on the bottom surface of board 32 and may be separately connected to a corresponding conductor 36 and the common conductor 35. The values of these resistances may, of course, be preselected for the specific purpose for which the transducer is intended. The ends of conductors 36 opposite those connected to the resistors 37 to 46 may include contact means 47 adapted to cooperate with contact means 48 on corresponding finger contacts 49. The finger contacts 49 are in closely spaced, parallel relation and in registry with the conductors 36. They may be mounted in a conducting block 50 that is fixed to the board 32. The block 50 may have a terminal 51 that may be connected to a terminal 52 of conductor 35 through a very high resistance 54, and in the embodiment disclosed, which deals with a telephone subscriber line, such resistance may be in the order of 3.9 megohms so as not to interfere with voice transmission over the subscribers' lines across which the transducer may be connected. Individual finger adjustment screws 50A also may be provided.

A stirrup 55 may depend from the insulated board 32 through the frame 15, and it may fixedly support one end of a flexible strip 56 that may lie over and in contact with the upper end of protuberance 31 on responsive element 27. The end of flexible member 56 opposite that connected to stirrup 55 adapted to support a stepped cam member 57 having a number of steps 58 equal to, and aligned with the finger contacts 49. Each step 58 is at a slightly different elevation, and the sequence in which they become effective is such that as the cam member 57 descends from an upper position when all contacts 47, 48 are open, one end finger spring 49 first closes; thereafter, continued downward movement of cam member 57 renders effective, successively and alternately, two finger springs 49 on each side of the median until the last has been closed. Thus, a balanced effect is provided inasmuch as the fingers are alternated from side to side.

From the foregoing description it is evident that by adjusting the position of board 32 on frame 15 by loosening screws 34, the point 59 of engagement between member 56 and protuberance 31 may be changed to vary the stroke of cam member 57. Also, by adjusting screw 18, the effectiveness of the responsive element 27 may be changed.

Figure 7:
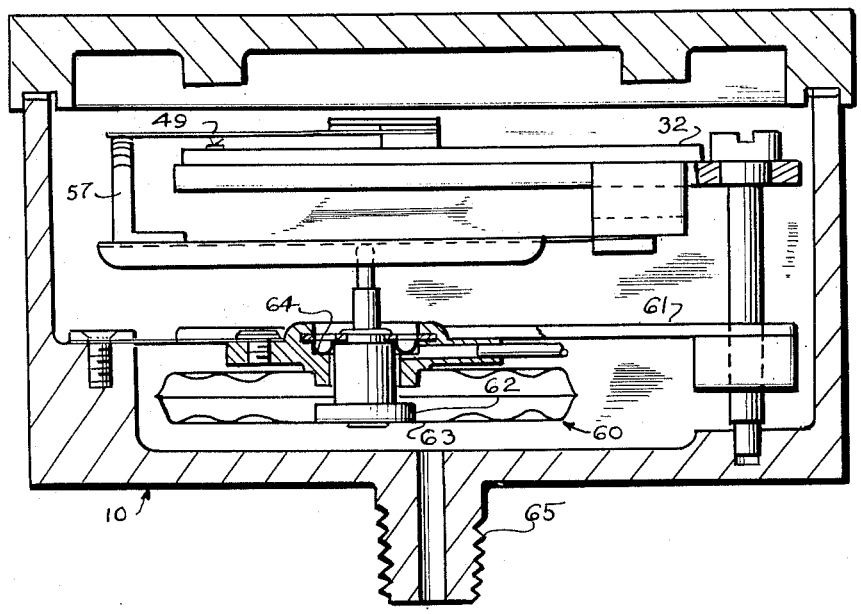
FIG. 7 is a sectional view of a modified form of the invention.

In the form shown in FIGS. 1 to 6, inclusive, the interior of the casing 10 is subjected to atmospheric pressure and the interior of the responsive element is subjected to pressure in the cable. If it is desired to reverse the application of pressure, the form shown in FIG. 7 may be used wherein similar parts are given the same reference numerals.

Case 10 has a printed circuit board 32 therein with a stepped cam 57 supported and operated in the same manner as described for the previous form. Pressure responsive element 60 is carried on flexible sheet member 61 which is generally similar to member 22 of FIG. 1. Piston 62 has one end fastened to the lower face 63 of responsive element 60. Flexible seal 64 seals the interior of the pressure responsive element 60. Connection element 65 may be connected to the pressure to be measured, the interior of the pressure responsive element 60 being vented through a passage (not shown) with the exterior of the case 10. It should be apparent that with change in pressure being measured, the stepped cam 57 will be operated in the same direction as in FIG. 1.

By having a plurality of the transducers at intervals along a fluid pressure line containing a dielectric or the like that surrounds subscriber transmission lines therein, and with a predetermined pressure in the fluid pressure line, any point or points of leakage can be located by the pattern of resistance values that are connected into the circuit by the action of the transducers, which variation in resistance values can be observed at the central station.

Although the various features of the new and improved transducer have been shown and described in detail to fully disclose one embodiment of the invention, it will be evident that changes may be made in such details and certain features may be used without others without departing from the principles of the invention.

What is claimed is:

1. In a transducer, a support; a component supporting frame mounted on said support; a flexible strip having its one end fixed to said support and its opposite end adjustably connected to said frame; a pressure-sensitive element mounted on said flexible strip; a circuit board mounted on said frame; a plurality of impedances mounted on said circuit board; a plurality of corresponding finger contacts mounted on said board, one connected to each of said impedances; another flexible strip means having one end connected to and spaced from said board, said strip means being in cooperating position with said pressure-sensitive element; and stepped cam means at the free end of said other flexible strip means and in cooperating position relative to the free ends of said finger contacts, whereby when said pressure-sensitive element is subjected to pressure fluctuations, predetermined of said finger contacts are actuated.

2. In a transducer, a support; a component supporting frame mounted on said support; a pressure-sensitive element mounted on said support; a circuit board mounted on said frame; a plurality of impedances mounted on said circuit board; a plurality of corresponding finger contacts mounted on said board, one connected to each of said impedances; flexible strip means having one end connected to and spaced from said board, said strip means being in cooperating position with said pressure-sensitive element; and stepped cam means at the free end of said flexible strip means and in cooperating position relative to the free ends of said finger contacts, whereby when said pressure-sensitive element is subjected to pressure fluctuations, predetermined of said finger contacts are actuated.

3. In a transducer, a support; a component supporting frame adjustably mounted on said support; flexible strip means having its one end stationarily mounted on said support and its opposite end adjustably connected to said frame; a pressure-sensitive element mounted on said flexible strip; a circuit board mounted on said frame; a plurality of impedance mounted on said circuit board; a plurality of corresponding finger contacts mounted on said board, one connected to each of said impedances; another flexible strip means having one end connected to and spaced from said board, said strip means being in cooperating position with said pressure-sensitive element; and stepped cam means at the free end of said other flexible, strip means and in cooperating position relative to the free ends of said finger contacts, whereby when said pressure-sensitive element is subjected to pressure fluctuations, predetermined of said finger contacts are actuated.

4. In a transducer, a support; a component supporting frame adjustably mounted on said support; a pressure-sensitive element mounted on said support; a circuit board mounted on said frame; a plurality of impedance mounted on said circuit board; a plurality of corresponding finger contacts mounted on said board, one connected to each of said impedances; flexible strip means having one end connected to and spaced from said board, said strip means being in cooperating position with said pressure-sensitive element; and stepped cam means at the free end of said flexible strip means and in cooperating position relative to the free ends of said finger contacts, whereby when said pressure-sensitive element is subjected to pressure fluctuations, predetermined of said finger contacts are actuated.

5. In a transducer, a support; a component supporting frame mounted on said support; flexible strip means having its one end stationarily mounted at one end of said support and its opposite end adjustably connected to said frame; a pressure-sensitive element mounted on said flexible strip means; a circuit board mounted on said frame; a plurality of corresponding finger contacts mounted on said board, one connected to each of said impedances; another flexible strip means having one end connected to and spaced from said board, said strip means being in cooperating position with said pressure-sensitive element; and cam means at the free end of said other flexible strip and in cooperating position relative to the free ends of said finger contacts, said cam means including a separate step of different elevation for each of said finger contacts and arranged such that said finger contacts are successively operated on alternate sides of a medial line as said cam means is raised and lowered.

6. In a transducer, a support; a component supporting frame mounted on said support; a pressure-sensitive element mounted on said support; a circuit board mounted on said frame; a plurality of impedances mounted on said circuit board; a plurality of corresponding finger contacts mounted on said board, one connected to each of said impedances; flexible strip means having one end connected to and spaced from said board, said strip means being in cooperating position with said pressure-sensitive element; and cam means at the free end of said flexible strip means and in cooperating position relative to the free ends of said finger contacts, said cam means including a separate step of different elevation for each of said finger contacts and arranged such that said finger contacts are successively operated on alternate sides of a medial line as said cam means is raised and lowered.

7. In a transducer, a support; a component supporting frame adjustably mounted on said support; a flexible strip having its one end fixedly mounted at one end of said support and its opposite end adjustably connected to said frame; a pressure-sensitive element mounted on said flexible strip; a circuit board mounted on said frame; a plurality of impedances mounted on said circuit board; a plurality of corresponding finger contacts mounted on said board, one connected to each of said impedances; another flexible strip means having one end connected to and spaced from said board, said strip means being in cooperating position with said pressure-sensitive element; and cam means at the free end of said other flexible strip and in cooperating position relative to the free ends of said finger contacts, said cam means including a separate step of different elevation for each of said finger contacts and arranged such that said finger contacts are successively operated on alternate sides of a medial line as said cam means is raised and lowered.

8. In a transducer, a support; a component supporting frame adjustably mounted on said support; a pressure-sensitive element mounted on said support; a circuit board mounted on said frame; a plurality of impedances mounted on said circuit board; a plurality of corresponding finger contacts mounted on said board, one connected to each of said impedances; flexible strip means having one end connected to and spaced from said board, said strip means being in cooperating position with said pressure-sensitive element; and cam means at the free end of said flexible strip means and in cooperating position relative to the free ends of said finger contacts, said cam means including a separate step of different elevation for each of said finger contacts and arranged such that said finger contacts are successively operated on alternate sides of a medial line as said cam means is raised and lowered.

9. In a transducer, a support; a component supporting frame mounted on said support; flexible strip means having its one end fixedly mounted at one end of said support and its opposite end adjustably connected to said frame; a pressure-sensitive element mounted on said flexible strip means; a circuit board mounted on said frame; a plurality of impedances mounted on said circuit board; a plurality of corresponding finger contacts mounted on said board, one connected to each of said impedances; another flexible strip means having one end connected to and spaced from said board, said strip means being in cooperating position with said pressure-sensitive element; and cam means at the free end of said other flexible strip means and in cooperating position relative to the free ends of said finger contacts, said cam means including a separate step of different elevation for each of said finger contacts and arranged such that alternately two adjacent finger contacts on each side of a medial point are actuated successively as said cam means is raised and lowered.

10. In a transducer, a support; a component supporting frame mounted on said support; a pressure-sensitive element mounted on said support; a circuit board mounted on said frame; a plurality of impedances mounted on said circuit board; a plurality of corresponding finger contacts mounted on said board, one connected to each of said impedances; flexible strip means having one end connected to and spaced from said board, said strip means being in cooperating position with said pressure-sensitive element; and cam means at the free end of said flexible strip means and in cooperating position relative to the free ends of said finger contacts, said cam means including a separate step of different elevation for each of said finger contacts and arranged such that alternately two adjacent finger contacts on each side of a medial point are actuated successively as said cam means is raised and lowered.

11. In a transducer, a support; a component supporting frame adjustably mounted on said support; flexible strip means having its one end fixedly mounted at one end of said support and its opposite end adjustably connected to said frame; a pressure-sensitive element mounted on said flexible strip means; a circuit board mounted on said frame; a plurality of impedances mounted on said circuit board; a plurality of corresponding finger contacts mounted on said board, one connected to each of said impedances; another flexible strip means having one end connected to and spaced from said board, said strip means being in cooperating position with said pressure-sensitive element; and cam means at the free end of said other flexible strip means and in cooperating position relative to the free ends of said finger contacts, said cam means including a separate step of different elevation for each of said finger contacts and arranged such that alternately two adjacent finger contacts on each side of a medial point are actuated successively as said cam means is raised and lowered.

12. In a transducer, a support; a component supporting frame adjustably mounted on said support; a pressure-sensitive element mounted on said support; a circuit board mounted on said frame; a plurality of impedances mounted on said circuit board; a plurality of corresponding finger contacts mounted on said board, one connected to each of said impedances; flexible strip means having one end connected to and spaced from said board, said strip means being in cooperating position with said pressure-sensitive element; and cam means at the free end of said flexible strip means and in cooperating position relative to the free ends of said finger contacts, said cam means including a separate step of different elevation for each of said finger contacts and arranged such that alternately two adjacent finger contacts on each side of a medial point are actuated successively as said cam means is raised and lowered.

13. In a transducer, a support; a component supporting frame mounted on said support; a screw having a cylindrical portion journaled in said frame; a nut threaded onto said screw; flexible strip means having its one end fixedly mounted at one end of said support and its opposite end connected to said nut; a pressure-sensitive element mounted on said flexible strip means; a circuit board mounted on said frame; a plurality of impedances mounted on said circuit board; a plurality of corresponding finger contacts mounted on said board, one connected to each of said impedances; another flexible strip having its one end connected to said board and lying in cooperating position with said pressure-sensitive element; and stepped cam means at the free end of said other flexible strip and in cooperating position relative to the free ends of said finger contacts, whereby when said pressure-sensitive element is subjected to pressure fluctuations, predetermined of said finger contacts are actuated.

14. In a transducer, a support; a component supporting frame adjustably mounted on said support; a screw having a cylindrical portion journaled in said frame; a nut threaded onto said screw; a spring between said nut and frame; flexible strip means having its one end fixedly mounted at one end of said support and its opposite end connected to said nut; a pressure-sensitive element mounted on said flexible strip means; a circuit board mounted on said frame; a plurality of impedances mounted on said circuit board; a plurality of corresponding finger contacts mounted on said board, one connected to each of said impedances; another flexible strip having its one end connected to said board and lying in cooperating position with said pressure-sensitive element; and stepped cam means at the free end of said other flexible strip means and in cooperating position relative to the free ends of said finger contacts, whereby when said pressure-sensitive element is subjected to pressure fluctuations, predetermined of said finger contacts are actuated.

15. In a transducer, a support; a component supporting frame mounted on said support; a screw having a cylindrical portion journaled in said frame; a nut threaded onto said screw; flexible strip means having its one end fixedly mounted at one end of said support and its opposite end connected to said nut; a pressure-sensitive element mounted on said flexible strip means; a circuit board mounted on said frame; a plurality of impedances mounted on said circuit board; a plurality of corresponding finger contacts mounted on said board, one connected to each of said impedances; another flexible strip means having its one end connected to said board and lying in cooperating position with said pressure-sensitive element; and cam means at the free end of said other flexible strip means and in cooperating position relative to the free ends of said finger contacts, said cam means including a separate step of different elevation for each of said finger contacts and arranged such that said finger contacts are successively operated on alternate sides of a medial line as said cam means is raised and lowered.

16. In a transducer, a support; a component supporting frame adjustably mounted on said support; a screw having a cylindrical portion journaled in said frame; a nut threaded onto said screw; a spring between said nut and frame; flexible strip means having its one end fixedly mounted at one end of said support and its opposite end connected to said nut; a pressure-sensitive element mounted on said flexible strip means; a circuit board mounted on said frame; a plurality of impedances mounted on said circuit board; a plurality of corresponding finger contacts mounted on said board, one connected to each of said impedances; another flexible strip means having its one end connected to said board and lying in cooperating position with said pressure-sensitive element; and cam means at the free end of said other flexible strip means and in cooperating position relative to the free ends of said finger contacts, said cam means including a separate step of different elevation for each of said finger contacts and arranged such that said finger contacts are successively operated on alternate sides of a medial line as said cam means is raised and lowered.

17. In a transducer, a support; a component supporting frame mounted on said support; a screw having a cylindrical portion journaled in said frame; a nut threaded onto said screw; flexible strip means having its one end fixedly mounted at one end of said support and its opposite end connected to said nut; a pressure-sensitive element mounted on said flexible strip means; a circuit board mounted on said frame; a plurality of impedances mounted on said circuit board; a plurality of corresponding finger contacts mounted on said board, one connected to each of said impedances; another flexible strip means having one end connected to and spaced from said board, said strip means lying in cooperating position with said pressure-sensitive element; and cam means at the free end of said other flexible strip means and in cooperating position relative to the free ends of said finger contacts, said cam means including a separate step of different elevation for each of said finger contacts and arranged such that alternately two adjacent finger contacts on each side of a medial point are actuated successively as said cam means is raised and lowered.

18. In a transducer, a support; a component supporting frame adjustably mounted on said support; a screw having a cylindrical portion journaled in said frame; a nut threaded onto said screw; a spring between said nut and frame; flexible strip means having its one end fixedly mounted at one end of said support and its opposite end connected to said nut; a pressure-sensitive element mounted on said flexible strip means; a circuit board mounted on said frame; a plurality of impedances mounted on said circuit board; a plurality of corresponding finger contacts mounted on said board, one connected to each of said impedances; another flexible strip means having its one end connected to said board and lying in cooperating position with said pressure-sensitive element; and cam means at the free end of said other flexible strip means and in cooperating position relative to the free ends of said finger contacts, said cam means including a separate step of different elevation for each of said finger contacts and arranged such that alternately two adjacent contacts on each side of a medial point are actuated successively as said cam means is raised and lowered.

19. In a transducer, a support; a component supporting frame adjustably mounted on said support; a pressure-sensitive element mounted on said support; a circuit board mounted on said frame; a plurality of impedances mounted on said circuit board; a plurality of corresponding finger contacts mounted on said board, one connected to each of said impedances; flexible strip means having one end connected to and spaced from said board, said strip means being in cooperating position with said pressure-sensitive element; and cam means at the free end of said flexible strip means and in cooperating position relative to the free ends of said finger contacts, said cam means including a separate step of different elevation for each of said finger contacts and arranged such that alternately two adjacent finger contacts on each side of a medial point are actuated successively as said cam means is raised and lowered.

20. In a transducer, a support; a component supporting frame mounted on said support; a flexible strip having its one end fixed to said support and its opposite end adjustably connected to said frame; a pressure-sensitive element mounted on said flexible strip; a circuit board mounted on said frame; a plurality of impedances mounted on said circuit board; a plurality of corresponding finger contacts mounted on said board, one connected to each of said impedances; another flexible strip means having one end connected to and spaced from said board, said strip means being in cooperating position with said pressure-sensitive element; and cam means at the free end of said other flexible strip means and in cooperating position relative to the free ends of said finger contacts, said cam means having an active surface of such construction that when said pressure-sensitive element is subjected to pressure fluctuations, predetermined of said finger contacts are actuated.

References Cited by the Examiner
UNITED STATES PATENTS

| | | | |
|---|---|---|---|
| 1,952,679 | 3/1934 | Leveen | 338—201 X |
| 2,254,366 | 9/1941 | Hammond | 338—201 X |
| 2,551,523 | 5/1951 | Bacca | 338—39 |

RICHARD M. WOOD, *Primary Examiner.*